April 29, 1930.  C. V. SWEARINGEN  1,756,105
CHLORINATOR
Filed July 23, 1929
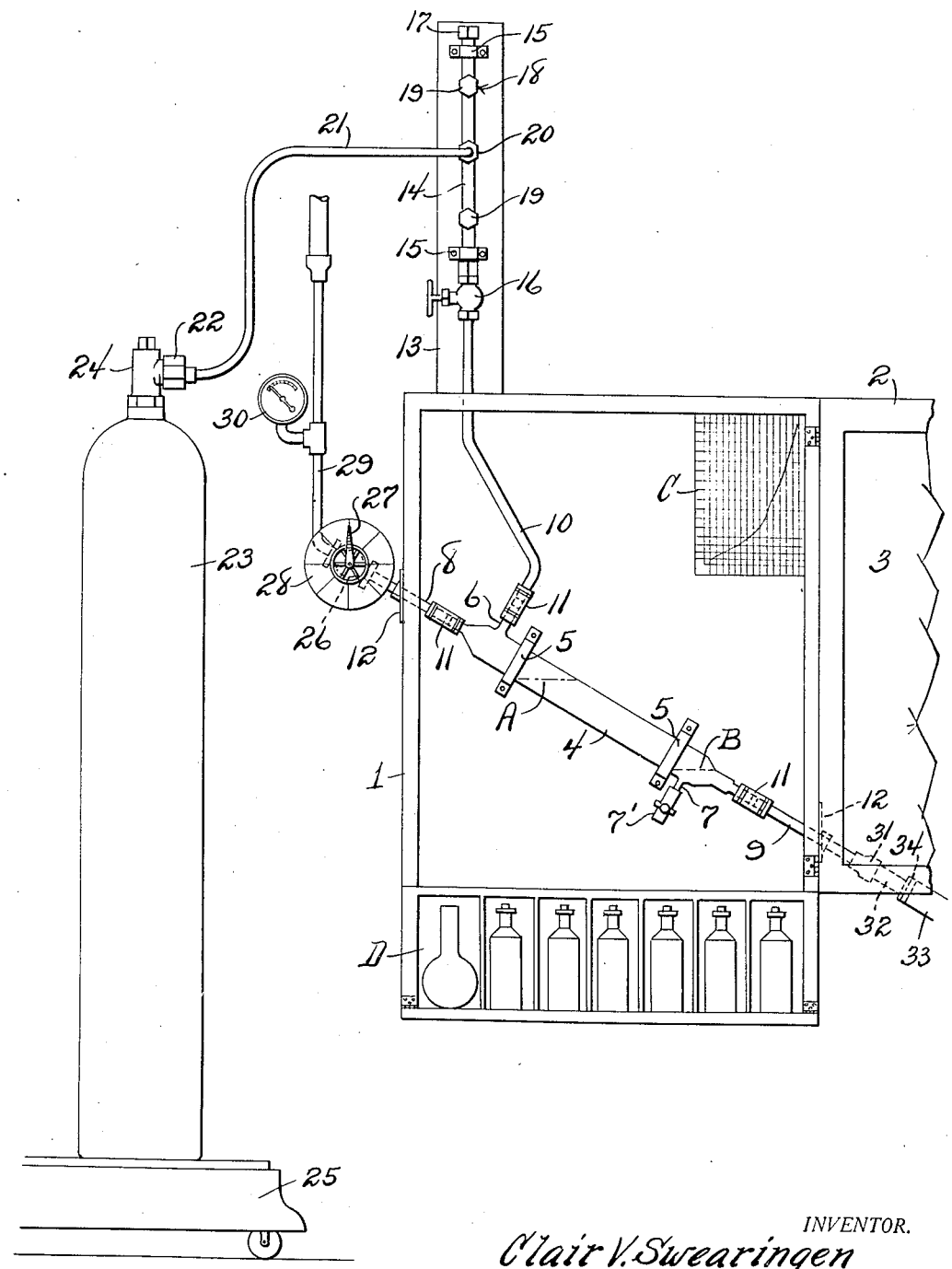
INVENTOR.
Clair V. Swearingen
BY
Victor J. Evans
ATTORNEY.

Patented Apr. 29, 1930

1,756,105

UNITED STATES PATENT OFFICE

CLAIR V. SWEARINGEN, OF CHATTANOOGA, TENNESSEE

CHLORINATOR

Application filed July 23, 1929. Serial No. 380,399.

This invention relates to a chlorinator, the general object of the invention being to provide a portable and inexpensive apparatus for mixing chlorine with a liquid so that the chlorine solution can be used for the sterilization and treatment of water, sewage, industrial wastes and for bleaching and other purposes.

Another object of the invention is to provide means whereby the chlorine can be mixed with water in any desired proportions.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing which is a diagrammatic view of the invention, with the parts in elevation.

In this view, the numeral 1 indicates a case which is provided with a door 2 having a transparent part 3. A cylinder 4 is diagonally arranged in the case and is supported therein by the brackets 5 which have linings of resilient or flexible material. The cylinder is formed in whole or part of transparent material and has its ends reduced and the upper end of the cylinder is formed with an upwardly extending nipple 6 and the lower end with a downwardly extending nipple 7. A pipe 8 is connected with the upper end of the cylinder and a pipe 9 is connected with the lower end thereof and a pipe 10 is connected with the nipple 6. All of these pipes are connected with the parts of the cylinder by the chemically treated rubber tubing 11, tightly wired and then taped so that the tubing is reinforced and will not be affected by the chlorine. The ends of the pipes are spaced from the cylinder parts, as shown, which gives flexibility and avoids the breaking of the cylinder. The pipes 8 and 9 pass through the sides of the case and are connected therewith by the clamps 12. The pipe 10 passes through the top of the case.

An upright 13 is connected with the top of the case and a vertically arranged manifold 14 is fastened thereto by the clamps or brackets 15. A needle valve 16 is connected with the lower end of the manifold and the upper end of the pipe 10 is connected with this valve. A cap 17 closes the upper end of the manifold and said manifold is provided with a number of nipples 18 which are threaded to receive the caps 19 or couplings, one of which is shown at 20. This coupling 20 is connected by a pipe 21 to a coupling 22 which is adapted to engage the outlet nipple of a cylinder 23 containing chlorine gas in a liquid form, this gas being held in the liquid form due to the high pressure in the cylinder when the cylinder is full. These cylinders containing liquid chlorine can be obtained commercially from many chemical plants, as will be understood. The cylinder is provided with a valve 24 for controlling the discharge of the gas therein and said cylinder is placed on the scales 25. By providing a number of the nipples 18, a number of the cylinders 23 can be connected with the manifold by means of the couplings 20 and the pipes 21. The nipples 18, not being used, are closed by the caps 19. The caps contain lead washers, so as to form a tight joint with the nipples to prevent leakage.

The pipe 8 is connected to a valve 26, the stem of which has attached thereto a pointer 27 which operates over a dial 28 and a pipe 29 is connected with the valve and is also connected with a supply of water. This pipe 29 has a gauge 30 connected therewith for indicating the water pressure.

The pipe or tube 9 has its lower end connected with a reducer 31 to which is attached a tube 32 and a hose 33 is connected with the tube 32 by a metal clamp 34.

The pipe 9, the reducer 31 and the tube 32 are preferably formed of hard rubber and the hose 33 is chemically treated so that it will not be affected by the chlorine. This hose leads the solution to the point of use. The water pipes can be made of any desired metal, but I prefer to use a copper pipe for the pipe 10 and to make the manifold of bronze. I prefer to use 3/8 inch tubing for the pipe 10, 1/4 inch pipe for the water pipes and to make the tube 9 3/8 inches. I prefer to make the outlet end of the cylinder 4 with a contracted throat, decreasing in size from 1¼ inches in diameter to 11/20 of an inch in diameter and then suddenly decreasing to 3/8 of an inch, which is the diameter of the pipe 9. The reducer is 3/8 to 3/4 of an inch and the tube 32 is 3/4 of an inch in diameter. The hose 33 is 1 inch in diameter.

The valve 26 is opened to permit water to enter the cylinder 4 and this water level is shown at A. Then the valve 24 on cylinder 23 is opened completely and the needle valve 16 is opened just enough for the gas to force the level of water in cylinder 4 from position A to position B. If a greater amount of chlorine is desired, the water valve 26 is opened to a greater extent so that the water will completely fill the cylinder 4 and then the needle valve 16 is opened to let an amount of gas into the cylinder 4 which will force the water level to position B.

A chart C is placed in the case for facilitating the positioning of the water valve to secure the desired proportions of the water and chlorine, this chart indicating the various positions of the valve 26 to secure the desired proportions when certain amounts of chlorine are being fed to the cylinder 4 per hour.

A plurality of chambers D is formed in the lower part of the case to receive containers and the like for permitting testing of the solution for residual chlorine.

From the foregoing it will be seen that I have provided a portable and inexpensive apparatus for producing chlorine solution and one which can be used by small municipalities. The apparatus has a great range of chlorine feed from zero to 13 pounds per hour and is dependable and accurate and a thin sheet of water, cylindrical in shape, gives a great area of contact between the water and chlorine gas. Due to the large openings and the small number of openings, danger of clogging is practically eliminated and the operation is visible through the transparent parts. The apparatus has great simplicity and all the parts are non-corrosive, and the apparatus can be easily and readily repaired.

A short tube 7' is connected with the drain nipple 7 and this tube can be closed by a valve or a clamp. This nipple provides means for draining the cylinder 4 and admitting air thereto.

What I claim is:—

A device of the class described comprising a cylinder diagonally supported and formed of transparent material, means for connecting the upper end of the cylinder with a water supply, such means including a valve and means for indicating the amount of opening of the valve, discharge means connected with the lower end of the cylinder and valve controlled means for feeding chlorine gas to the upper part of the cylinder, said cylinder having a restricted outlet end for retarding the flow of water therefrom, whereby the water level in the cylinder acts to indicate when the desired proportions of water and gas are being fed.

In testimony whereof I affix my signature.

CLAIR V. SWEARINGEN.